H. M. KAUL.
TROLLEY WHEEL.
APPLICATION FILED JAN. 12, 1921.
1,400,681. Patented Dec. 20, 1921.
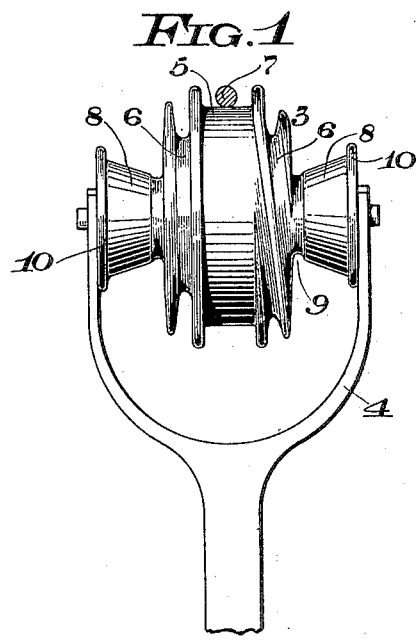
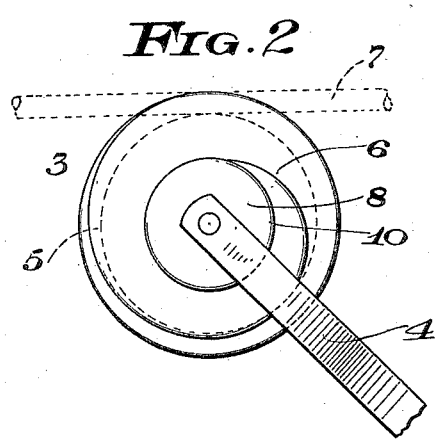
WITNESSES
H. D. Chase
C. L. Naal
INVENTOR
Herman M. Kaul
By R. S. Caldwell
ATTORNEY

UNITED STATES PATENT OFFICE.

HERMAN M. KAUL, OF CEDARBURG, WISCONSIN.

TROLLEY-WHEEL.

1,400,681.         Specification of Letters Patent.         Patented Dec. 20, 1921.

Application filed January 12, 1921.   Serial No. 436,828.

*To all whom it may concern:*

Be it known that I, HERMAN M. KAUL, a citizen of the United States, and resident of Cedarburg, in the county of Ozaukee and State of Wisconsin, have invented new and useful Improvements in Trolley-Wheels, of which the following is a description, reference being had to the accompanying drawings, which are a part of this specification.

The invention relates to trolley wheels.

The object of the invention is to provide a trolley wheel of the spiral groove return type in which cone-shaped members connect with the ends of the spiral grooves to bring the wire into a position to be returned to the running portion of the wheel by said grooves.

The invention further consists in the several features hereinafter set forth and more particularly defined by claim at the conclusion hereof.

In the drawings: Figure 1 is an end elevation view of a device embodying the invention; Fig. 2 is a side elevation view thereof.

The trolley wheel 3 is pivotally mounted in the harp 4 and is provided with a running groove 5, spiral grooves 6 for returning the trolley wire 7 to the groove 5 in case said wire jumps out of said groove and extensions 8.

These extensions 8 are cone-shaped with their portions of smaller diameter disposed adjacent the outer end grooves 9 in each of the spiral grooves 6 terminate and are provided with retaining flanges 10.

Under normal running operation the wire 7 runs in the groove 5 but in case the trolley jumps the wire and strikes either one of the cones 8 then the wire is pushed down to the smaller end of the cone and is carried up by the spiral groove 6 adjacent thereto onto the groove 5. It will, of course, be understood that the grooves 6 only return the wire to the groove 5.

What I claim as my invention is:

A trolley wheel having a running groove, spiral return grooves leading to the running groove, each spiral groove terminating in a circular groove, and conical extensions having their smaller ends communicating with said circular grooves.

In testimony whereof, I affix my signature, in presence of witnesses.

HERMAN M. KAUL

Witnesses:
 CHARLES C. WIRTH,
 O. H. BECKMANN,
 OTTO A. MUELLER.